United States Patent
Hsu et al.

(10) Patent No.: US 9,280,192 B2
(45) Date of Patent: Mar. 8, 2016

(54) PROGRAMMABLE POWER SUPPLY

(71) Applicant: SYSTEM GENERAL CORPORATION, New Taipei (TW)

(72) Inventors: Yi-Min Hsu, Taichung (TW); Ta-Yung Yang, Milpitas, CA (US)

(73) Assignee: SYSTEM GENERAL CORPORATION, New Taipei (TW)

( * ) Notice: Subject to any disclaimer, the term of this patent is extended or adjusted under 35 U.S.C. 154(b) by 237 days.

(21) Appl. No.: 14/104,246

(22) Filed: Dec. 12, 2013

(65) Prior Publication Data

US 2014/0289540 A1    Sep. 25, 2014

Related U.S. Application Data

(63) Continuation of application No. 61/804,430, filed on Mar. 22, 2013.

(51) Int. Cl.
*G06F 1/26* (2006.01)
*G06F 1/28* (2006.01)

(52) U.S. Cl.
CPC ... *G06F 1/26* (2013.01); *G06F 1/28* (2013.01)

(58) Field of Classification Search
CPC ..................................... G06F 1/26; H02J 7/02
See application file for complete search history.

(56) References Cited

U.S. PATENT DOCUMENTS

| | | | | |
|---|---|---|---|---|
| 2009/0001937 A1* | 1/2009 | Densham | .................. | H02J 7/00 320/145 |
| 2010/0202159 A1* | 8/2010 | Sims | ................. | H02M 3/33523 363/15 |
| 2014/0368159 A1* | 12/2014 | Han | ...................... | H02M 3/155 320/107 |

* cited by examiner

*Primary Examiner* — Albert Wang
(74) *Attorney, Agent, or Firm* — McClure, Qualey & Rodack, LLP

(57) ABSTRACT

The present invention provides a method of programming a programmable power supply. In the method, a requesting signal is generated in a device, and the requesting signal is received in the programmable power supply. Then, an output voltage of the programmable power supply is determined in accordance with a frequency of the requesting signal. The output voltage of the programmable power supply is coupled to power a load of the device. A de-bounce operation is further provided for filtering noises of the requesting signal. The requesting signal comprises a high-state period and a low-state period. The high-state period is defined during which a level of the requesting signal is higher than a threshold. The low-state period is defined during which the level of the requesting signal is lower than the threshold. The output voltage of the programmable power supply is further determined by a period of the requesting signal.

16 Claims, 5 Drawing Sheets

| $T_H(\%)$ | $T_L(\%)$ | Output Voltage Vcc | Exampled Level |
|---|---|---|---|
| 80% | 20% | $V_0$ | 5V |
| 70% | 30% | $V_1$ | 6V |
| 60% | 40% | $V_2$ | 7.5V |
| 50% | 50% | $V_3$ | 9V |
| 40% | 60% | $V_4$ | 12V |
| 30% | 70% | $V_5$ | 15V |
| 20% | 80% | $V_6$ | 18V |

FIG. 7A

| (1/T)Min. | (1/T)Std. | (1/T)Max. | Output Voltage Vcc | Exampled Level |
|---|---|---|---|---|
| 40 Hz | 50 Hz | 60 Hz | $V_0$ | 5V |
| 70 Hz | 80 Hz | 90 Hz | $V_1$ | 6V |
| 100 Hz | 110 Hz | 120 Hz | $V_2$ | 7.5V |
| 130 Hz | 140 Hz | 150 Hz | $V_3$ | 9V |
| 160 Hz | 170 Hz | 180 Hz | $V_4$ | 12V |
| 190 Hz | 200 Hz | 210 Hz | $V_5$ | 15V |
| 220 Hz | 230 Hz | 240 Hz | $V_6$ | 18V |

FIG. 7B

PROGRAMMABLE POWER SUPPLY

CROSS REFERENCE TO RELATED APPLICATIONS

This application claims the benefit of U.S. Provisional Application No. 61/804,430, filed on Mar. 22, 2013, the contents of which are incorporated herein by reference.

BACKGROUND OF THE INVENTION

1. Field of the Invention

The present invention relates to a programmable power supply; more specifically, the present invention relates to a method of programming a programmable power supply.

2. Description of the Related Art

Manufacturers of today's power supplies for mobile devices, such as notebooks, cellular phones, and tablet computers, provide various designs to supply those mobile devices with different supply voltages. Therefore, users with multiple mobile devices are often required to carry all of those power supplies for providing power to each individual mobile device, which becomes a burden for the users who often carry those mobile devices with them. In order to reduce such burdens, power supplies manufacturers have developed a programmable power supply capable of supplying different voltages on the demand of the mobile devices. Communication between the programmable power supplies and the mobile devices to guarantee safe and stable voltage switching becomes a major concern.

BRIEF SUMMARY OF THE INVENTION

The objective of the present invention is to providing a method of programming a programmable power supply to power the mobile device on its demand.

The present invention provides a method of programming a programmable power supply. The method comprises: generating a requesting signal in a device; receiving the requesting signal in the programmable power supply; and determining an output voltage of the programmable power supply in accordance with a frequency of the requesting signal. The output voltage of the programmable power supply is coupled to power a load of the device. The method further comprises providing a de-bounce operation for filtering noises of the requesting signal. The requesting signal comprises a high-state period and a low-state period. The high-state period is defined during which a level of the requesting signal is higher than a threshold. The low-state period is defined during which the level of the requesting signal is lower than the threshold. The output voltage of the programmable power supply is further determined by the high-state period of the requesting signal. The output voltage of the programmable power supply is further determined by the low-state period of the requesting signal. The output voltage of the programmable power supply is further determined by a period of the requesting signal.

The present invention also provides a method of programming a programmable power supply. The method comprises: generating a requesting signal in a device; receiving the requesting signal in the programmable power supply; detecting a high-state period of the requesting signal; detecting a low-state period of the requesting signal; checking whether the high-state period of the requesting signal meets a first boundary condition; checking whether the low-state period of the requesting signal meets a second boundary condition; and determining an output voltage of the programmable power supply in accordance with a result of the checking step of the high-state period and a result of the checking step of the low-state period. The output voltage of the programmable power supply is coupled to power a load of the device. The method further comprises providing a de-bounce operation for filtering noises of the requesting signal. The high-state period is defined during which a level of the requesting signal is higher than a threshold. The low-state period is defined during which the level of the requesting signal is lower than the threshold. The step of determining the output voltage of the programmable power supply comprises: generating a count in accordance with the result of the checking step of the high-state period and the result of the checking step of the low-state period; and determining the output voltage of the programmable power supply in accordance with a value of the count. When the high-state period of the requesting signal meets the first boundary condition and the low-state period of the requesting signal meets the second boundary condition, the value of the count is increased. When the high-state period of the requesting signal fails to meet the first boundary condition or the low-state period of the requesting signal fails to meet the second boundary condition, the value of the count is decreased.

The present invention further provides a method of programming a programmable power supply. The method comprises: generating a requesting signal in a device; detecting the requesting signal in the programmable power supply; and determining an output voltage of the programmable power supply in accordance with a ratio combination of a high-state period and a low-state period of the requesting signal. The output voltage of the programmable power supply is coupled to power a load of the device. The method further comprises providing a de-bounce operation for filtering noises of the requesting signal. The high-state period is defined during which a level of the requesting signal is higher than a threshold, and the low-state period is defined during which the level of the requesting signal is lower than the threshold. The ratio combination comprises a percentage of a period of the requesting signal being occupied by the high-state period and another percentage of the period of the requesting signal being occupied by the low-state period.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 7A shows an example of a cross-reference table of a high-state period, a low-state period, and an output voltage; and FIG. 7B shows an example of a cross-reference table of a frequency of the requesting signal and the output voltage.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
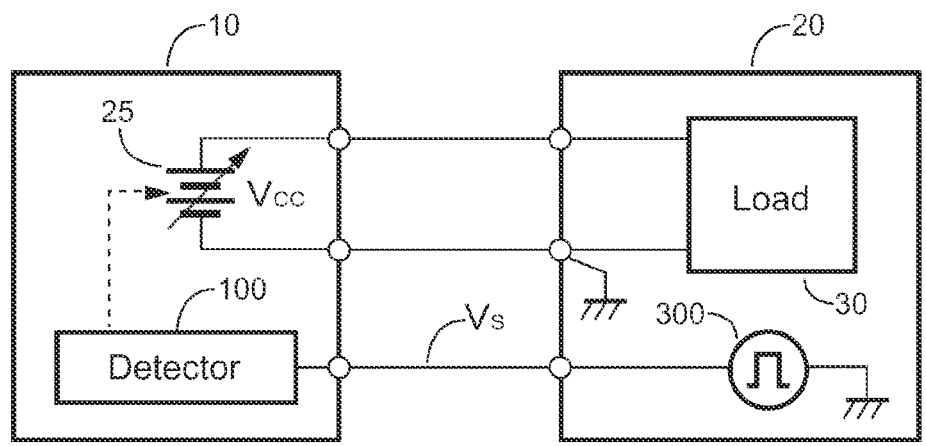
FIG. 1 shows a schematic of a system for programming a programmable power supply according to the present invention.

FIG. 1 shows a schematic of a system for programming a programmable power supply according to the present invention. A programmable power supply 10 includes a programmable voltage source 25 and a detector 100. The programmable voltage source 25 will provide an output voltage $V_{CC}$ coupled to power a load 30 of a device 20. The device 20 includes the load 30 and a signal generation circuit 300. In one embodiment of the present invention, the signal generation circuit 300 can be an application processor. Yet in another embodiment of the present invention, the signal generation circuit 300 can be a waveform generation circuit. The signal generation circuit 300 will generate a requesting signal $V_S$ to program the output voltage $V_{CC}$ in response to an energy demand of the load 30. The requesting signal $V_S$ may go from the device 20 to the detector 100 of the programmable power supply 10 via, for example, a D-wire of an USB (Universal Serial Bus) cable. The detector 100 controls the programmable voltage source 25 for generating the output voltage $V_{CC}$ in response to the requesting signal $V_S$. The output voltage $V_{CC}$ is programmed to a demanded level, such as 5V, 9V, 12V, 18V, etc, on the energy demand of the load 30.

Figure 2:
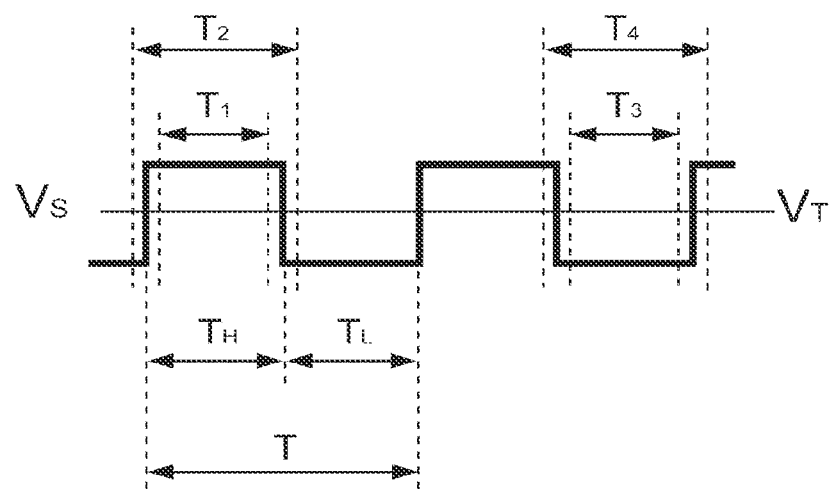
FIG. 2 shows a waveform of a requesting signal according to the present invention.

FIG. 2 shows the waveform of the requesting signal $V_S$ according to the present invention. The requesting signal $V_S$ has a high-state if the level of the requesting signal $V_S$ is higher than a threshold $V_T$. The requesting signal $V_S$ has a low-state if the level of the requesting signal $V_S$ is lower than the threshold $V_T$. $T_H$ represents a high-state period of the requesting signal $V_S$. $T_L$ represents a low-state period of the requesting signal $V_S$. T represents a period of the requesting signal $V_S$, which is the reciprocal of the frequency of the requesting signal $V_S$. The period T is also correlated to the high-state period $T_H$ and the low-state period $T_L$. A period $T_1$ defines a low-period-threshold for the high-state period $T_H$. A period $T_2$ defines a high-period-threshold for the high-state period $T_H$. A period $T_3$ defines a low-period-threshold for the low-state period $T_L$. A period $T_4$ defines a high-period-threshold for the low-state period $T_L$. The periods $T_1$ and $T_2$ define a first boundary condition (criterion) for the high-state period $T_H$. The periods $T_3$ and $T_4$ define a second boundary condition (criterion) for the low-state period $T_L$. Each pair of the high-state period $T_H$ and the low-state period $T_L$ will define one corresponding level of the output voltage $V_{CC}$. It is to be understood that the requesting signal $V_S$ can be in any waveform which alternately crosses at least one threshold, such as square wave, triangle wave, sinusoidal wave, etc.

Figure 3:
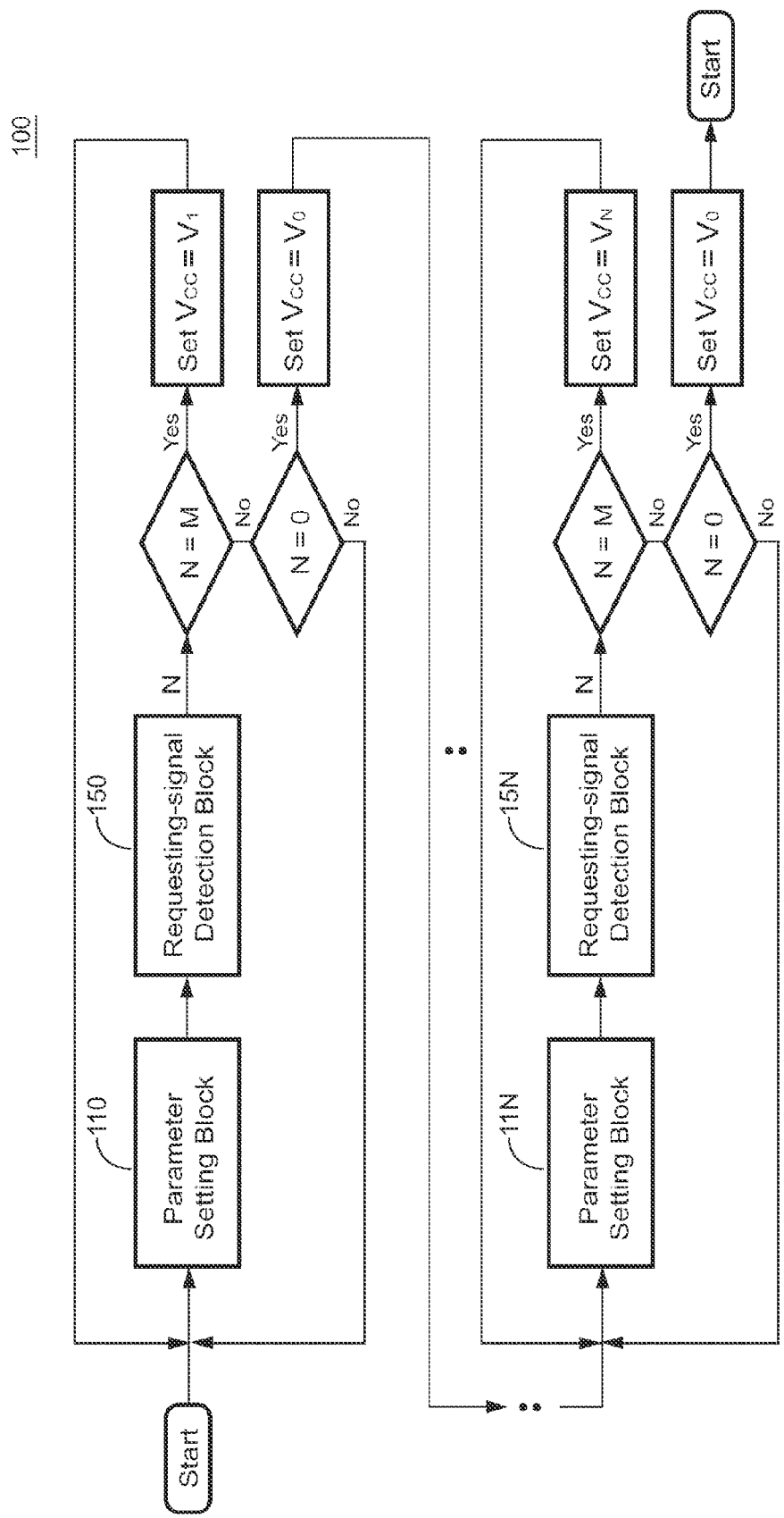
FIG. 3 shows an embodiment of a control flow of a detector according to the present invention.

FIG. 3 shows an embodiment of a control flow of the detector 100 according to the present invention. The detector 100 is used to detect the high-state period $T_H$ and the low-state period $T_L$ of the requesting signal $V_S$ for determining the level of the output voltage $V_{CC}$ that is demanded by the load 30. If the high-state period $T_H$ and the low-state period $T_L$ of the requesting signal $V_S$ meet the boundary conditions (criteria) as aforementioned, the detector 100 will control the programmable voltage source 25 to set a corresponding level of the output voltage $V_{CC}$ to power the load 30 of the device 20.

At the beginning of the control flow, the output voltage $V_{CC}$ is set as an initial voltage level $V_0$, e.g. 5V. A parameter setting block 110 will next set periods (parameters) $T_1$, $T_2$, $T_3$ and $T_4$. A requesting-signal detection block 150 will detect the high-state period $T_H$ and the low-state period $T_L$ of the requesting signal $V_S$ in reference with the periods $T_1$, $T_2$, $T_3$, and $T_4$ to generate a count N. If the high-state period $T_H$ and the low-state period $T_L$ of the requesting signal $V_S$ meet the criteria set by the parameters $T_1$, $T_2$, $T_3$, and $T_4$, the requesting-signal detection block 150 will increase a value of the count N by one (N=N+1). If the boundary conditions are met for more than M cycles, the value of the count N will be set as M (N=M). Once the value of the count N is equal to M, the output voltage $V_{CC}$ will be set as a voltage $V_1$, e.g. 6V.

If the high-state period $T_H$ and the low-state period $T_L$ of the requesting signal $V_S$ don't meet the boundary conditions set by the parameters $T_1$, $T_2$, $T_3$, and $T_4$, the requesting-signal detection block 150 will decrease the value of the count N by one (N=N−1). If the value of the count N is equal to zero (N=0), the output voltage $V_{CC}$ will be set as the initial voltage level $V_0$.

Therefore, the output voltage $V_{CC}$ can be set as any desired values ($V_0$, $V_1$, . . . , or $V_N$) according to the detected high-state period $T_H$ and the low-state period $T_L$ of the requesting signal $V_S$. Since the period T of the requesting signal $V_S$ is correlated to the high-state period $T_H$ and the low-state period $T_L$, it can be understood that in another embodiment, the output voltage $V_{CC}$ can be set as any desired values according to the period T (or the frequency) of the requesting signal $V_S$. In the requesting-signal detection block 150, a noise filtering (de-bounce) operation is further performed by the detector 100 to filter noises of the requesting signal $V_S$, such that the noise interference to the count N can be prevented.

Figure 4:
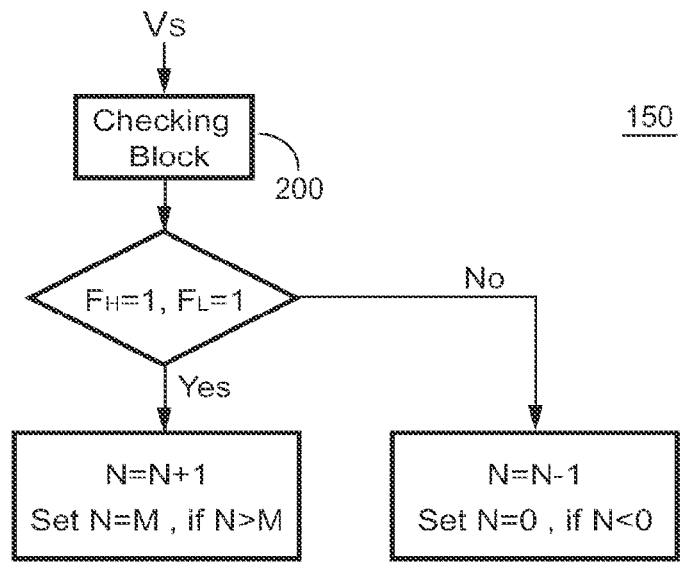
FIG. 4 shows a control flow of a requesting-signal detection block of the detector according to the present invention.

FIG. 4 shows a control flow of the requesting-signal detection block 150 of the detector 100 according to the present invention. A checking block 200 will check the high-state period $T_H$ and the low-state period $T_L$ of the requesting signal $V_S$ in reference with the parameters $T_1$, $T_2$, $T_3$, and $T_4$. If the high-state period $T_H$ and the low-state period $T_L$ of the requesting signal $V_S$ meet the boundary conditions set by the parameters $T_1$, $T_2$, $T_3$, and $T_4$, both of a flag $F_H$ and a flag $F_L$ will be set as 1. If the flags $F_H$ and $F_L$ are both equal to 1 (logical high) ($F_H$=1, $F_L$=1), the value of the count N will be increased by one (N=N+1). Once the value of the count N is increased to be greater than M, the value of the count N will be set as M (Set N=M, if N>M). If at least one of the high-state period $T_H$ and the period $T_L$ of the requesting signal $V_S$ fails to meet the corresponding boundary condition set by the parameters $T_1$ and $T_2$ or by the parameters $T_3$ and $T_4$, the value of the count N will be decreased by one (N=N−1). Once the value of the count N is decreased to be lower than zero, the value of the count N will be set as zero (Set N=0, if N<0).

Figure 5:
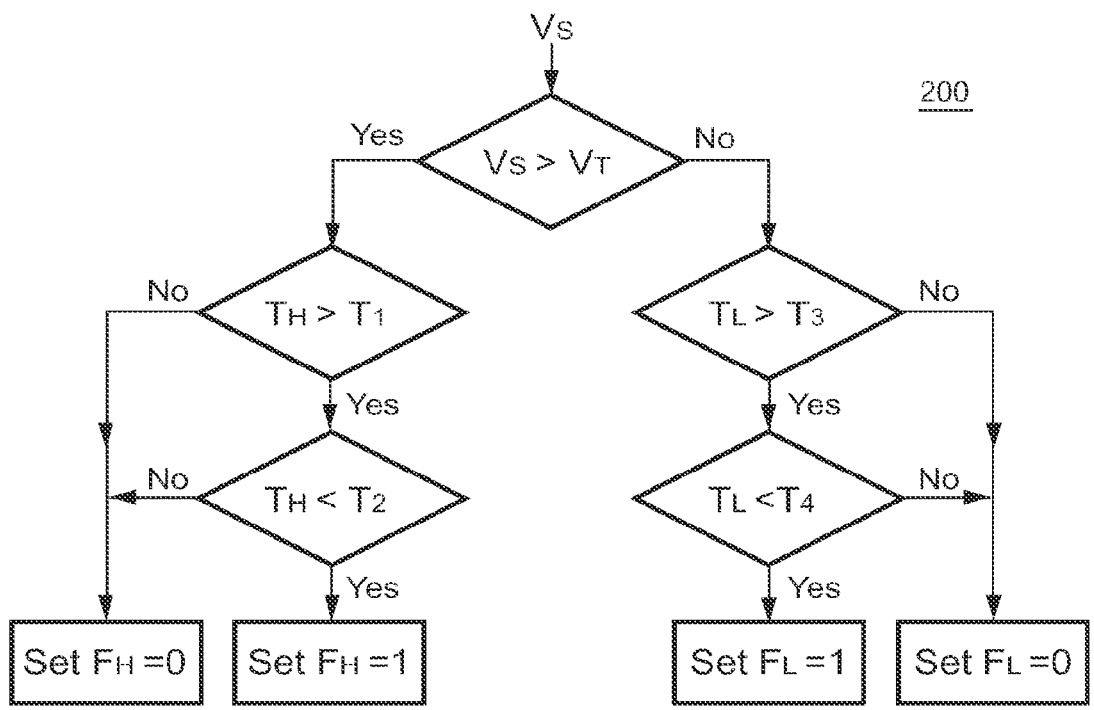
FIG. 5 shows a control flow of a checking block of the requesting-signal detection block according to the present invention.

FIG. 5 shows a control flow of the checking block 200 of the requesting-signal detection block 150 according to the present invention. The checking block 200 is used to check the level of the requesting signal $V_S$. While the level of the requesting signal $V_S$ is higher than the threshold $V_T$, the high-state period $T_H$ will be checked according to the parameters $T_1$ and $T_2$, in other words, it will be checked whether the high-state period $T_H$ meets the boundary condition defined by the parameters $T_1$ and $T_2$. Whenever the high-state period $T_H$ is greater than the period $T_1$ and, in the meantime, the high-state period $T_H$ is less than the period $T_2$, the high-state period $T_H$ meets the corresponding boundary condition, and the flag $F_H$ will be set as 1 (logical high) (Set $F_H$=1). Whenever the high-state period $T_H$ is equal to or less than the period $T_1$ and, in the meantime, the high-state period $T_H$ is greater than or equal to the period $T_2$, the high-state period $T_H$ does not meet the corresponding boundary condition, and the flag $F_H$ will be set as 0 (logical low) (Set $F_H$=0).

While the level of the requesting signal $V_S$ is less than or equal to the threshold $V_T$, the low-state period $T_L$ will be checked according to the parameters $T_3$ and $T_4$, in other words, it will be checked whether the low-state period $T_L$ meets the boundary condition defined by the parameters $T_3$ and $T_4$. Whenever the low-state period $T_L$ is greater than the period $T_3$ and, in the meantime, the low-state period $T_L$ is less than the period $T_4$, the low-state period $T_L$ meets the corresponding boundary condition, and the flag $F_L$ will be set as 1 (logical high) (Set $F_L$=1). Whenever the low-state period $T_L$ is equal to or less than the period $T_3$ and, in the meantime, $T_L$ is greater than or equal to the period $T_4$, the low-state period $T_L$ does not meet the corresponding boundary condition, and the flag $F_L$ will be set as 0 (logical low) (Set $F_L$=0).

Figure 6:
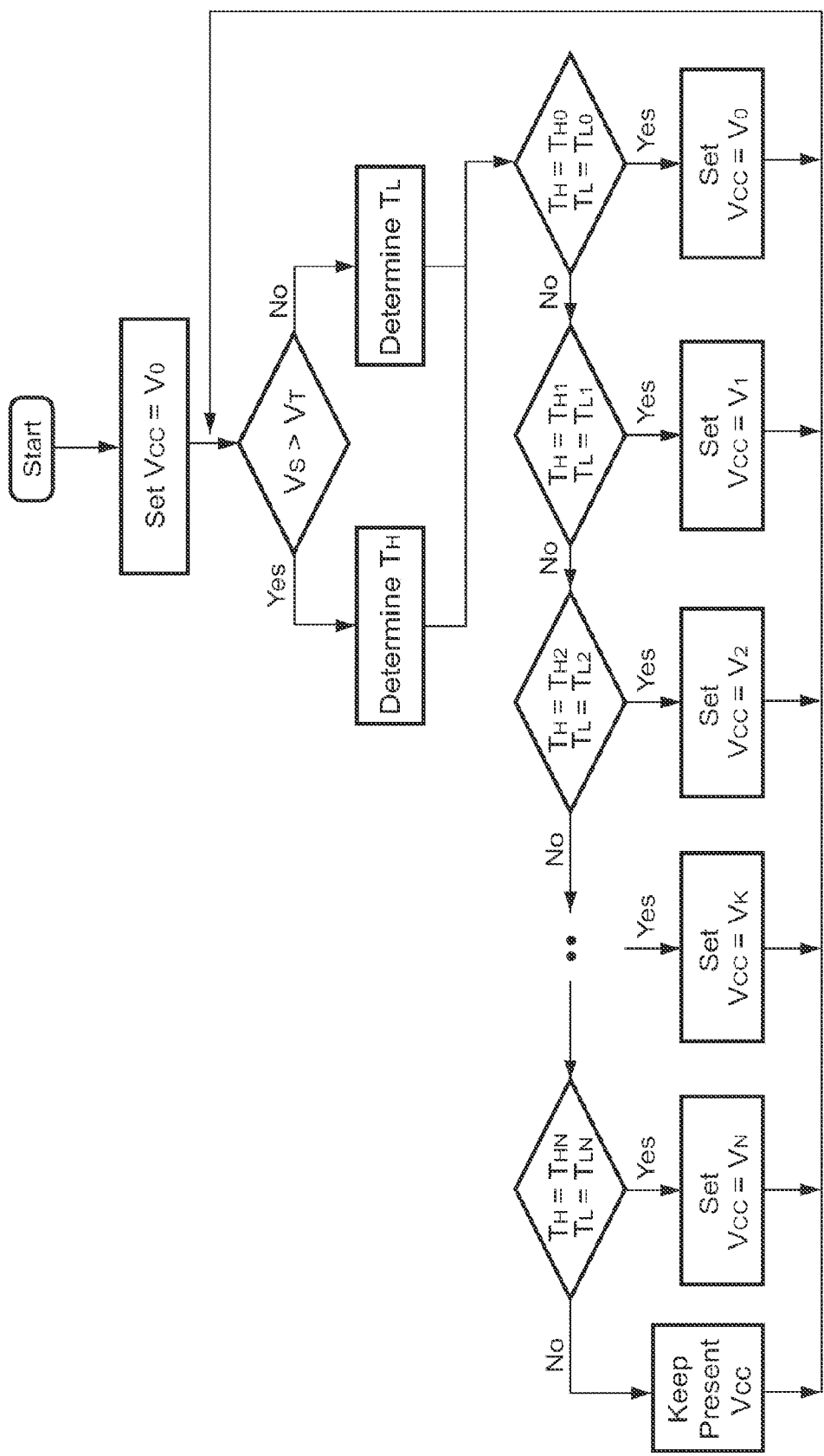
FIG. 6 shows another aspect of the control flow in FIG. 3 according to the present invention.

FIG. 6 shows another aspect of the control flow in FIG. 3 according to the present invention. At the beginning of the control flow, the output voltage $V_{CC}$ is set as the initial voltage level $V_0$. The high-state period $T_H$ of the requesting signal $V_S$ will be determined when the requesting signal $V_S$ is higher than the threshold $V_T$. The low-state period $T_L$ of the requesting signal $V_S$ will be determined when the requesting signal $V_S$ is lower than the threshold $V_T$. Criterion pairs are defined internally, such as a first criterion pair $T_{H1}$ and $T_{L1}$ to the last criterion pair $T_{HN}$ and $T_{LN}$. Once the high-state period $T_H$ equals to $T_{H1}$ and the low-state period $T_L$ equals to $T_{L1}$, the output voltage $V_{CC}$ will be set as $V_1$. When the high-state period $T_H$ is not equal to $T_{H1}$ and/or the low-state period $T_L$ is not equal to $T_{L1}$, the high-state period $T_H$ and the low-state period $T_L$ will be checked continuously in reference with at least one of the other criterion pairs, such as the criterion pair $T_{H2}$ and $T_{L2}$, the criterion pair $T_{H3}$ and $T_{L3}$, etc. Whenever any criterion pair is met, the output voltage $V_{CC}$ will be set as its corresponding level. Once all criterion pairs are not met, the output voltage $V_{CC}$ will be kept as its present level. Different criterion pairs define different ratio combinations for the high-state period $T_H$ and the low-state period $T_L$, and those criterion pairs will correspond to different levels of the output voltage $V_{CC}$. It is also understood that determining different frequency of the requesting signal $V_S$ can also correspond to different levels of the output voltage $V_{CC}$.

FIG. 7A shows an example of a cross-reference table of the high-state period $T_H$, the low-state period $T_L$ and the output voltage $V_{CC}$. The cross-reference table comprises different ratio combinations of the high-state period $T_H$ and the low-state period $T_L$ to determine the level of the output voltage $V_{CC}$. Each ratio combination comprises a percentage of the period T being occupied by the high-state period $T_H$ and another percentage of the period T being occupied by the low-state period $T_L$. It is preferred that possible ratio combinations can be defined at will and are not limited by the disclosed example in FIG. 7A. In an embodiment of the present invention, the ratio combination can include a varied high-state period $T_H$ associating with a fixed low-state period $T_L$. Yet in another embodiment of the present invention, the ratio combination can include a fixed high-state period $T_H$ associating with a varied low-state period $T_L$.

FIG. 7B shows an example of a cross-reference table of the output voltage $V_{CC}$ and the frequency (the reciprocal of the period T) of the requesting signal $V_S$. Each set of the frequency (1/T Std.) has its maximum frequency (1/T Max.) and minimum frequency (1/T Min.) to develop a hysteresis frequency range. For instance, the output voltage $V_{CC}$ will be set at 12V when the frequency of the requesting signal $V_S$ falls between 160 Hz and 180 Hz. It is preferred that the hysteresis frequency range can be defined at will and are not limited by the disclosed example in FIG. 7B.

Even though the exampled levels of the output voltage $V_{CC}$ are not identical to each other, it can be understood that those exampled levels of the output voltage $V_{CC}$ can be totally or partially identical to each other. Simply using a periodical requesting signal $V_S$ transmitted from the device 20 and received by the programmable power supply 10 to achieve communication between the both reduces the complexity of circuit design. Furthermore, with proper hysteresis ranges definition for the high-state period $T_H$, the low-state period $T_H$, and the period T of the requesting signal $V_S$, the programmable power supply 10 can switch its output voltage $V_{CC}$ to power the device 20 more precisely. Whenever the present invention is applied on the USB charger, the requesting signal $V_S$ can be transmitted through its intrinsic wire, such as D-wire, to reduce the manufacturing cost.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of programming a programmable power supply comprising:
   generating a requesting signal in a device;
   receiving said requesting signal in said programmable power supply; and
   determining an output voltage of said programmable power supply in accordance with a frequency of said requesting signal;
   wherein said output voltage of said programmable power supply is coupled to power a load of said device.

2. The method as claimed in claim 1 further comprising:
   providing a de-bounce operation for filtering noises of said requesting signal.

3. The method as claimed in claim 1,
   wherein said requesting signal comprises a high-state period and a low-state period; and
   wherein said high-state period is defined during which a level of said requesting signal is higher than a threshold, and said low-state period is defined during which said level of said requesting signal is lower than said threshold.

4. The method as claimed in claim 3, wherein said output voltage of said programmable power supply is further determined by said high-state period of said requesting signal.

5. The method as claimed in claim 3, wherein said output voltage of said programmable power supply is further determined by said low-state period of said requesting signal.

6. The method as claimed in claim 1, wherein said output voltage of said programmable power supply is further determined by a period of said requesting signal.

7. A method of programming a programmable power supply, comprising:
   generating a requesting signal in a device;
   receiving said requesting signal in said programmable power supply;
   detecting a high-state period of said requesting signal;
   detecting a low-state period of said requesting signal;
   checking whether said high-state period of said requesting signal meets a first boundary condition;
   checking whether said low-state period of said requesting signal meets a second boundary condition; and determining an output voltage of said programmable power supply in accordance with a result of said checking step of said high-state period and a result of said checking step of said low-state period;

wherein said output voltage of said programmable power supply is coupled to power a load of said device.

8. The method as claimed in claim 7 further comprising providing a de-bounce operation for filtering noises of said requesting signal.

9. The method as claimed in claim 7, wherein said high-state period is defined during which a level of said requesting signal is higher than a threshold, and said low-state period is defined during which said level of said requesting signal is lower than said threshold.

10. The method as claimed in claim 7, wherein said step of determining said output voltage of said programmable power supply comprises:

generating a count in accordance with said result of said checking step of said high-state period and said result of said checking step of said low-state period; and determining said output voltage of said programmable power supply in accordance with a value of said count.

11. The method as claimed in claim 10, wherein when said high-state period of said requesting signal meets said first boundary condition and said low-state period of said requesting signal meets said second boundary condition, said value of said count is increased.

12. The method as claimed in claim 10, wherein when said high-state period of said requesting signal fails to meet said first boundary condition or said low-state period of said requesting signal fails to meet said second boundary condition, said value of said count is decreased.

13. A method of programming a programmable power supply, comprising:

generating a requesting signal in a device;

detecting said requesting signal in said programmable power supply; and determining an output voltage of said programmable power supply in accordance with a ratio combination of a high-state period and a low-state period of said requesting signal;

wherein said output voltage of said programmable power supply is coupled to power a load of said device.

14. The method as claimed in claim 13 further comprising:

providing a de-bounce operation for filtering noises of said requesting signal.

15. The method as claimed in claim 13, wherein said high-state period is defined during which a level of said requesting signal is higher than a threshold, and said low-state period is defined during which said level of said requesting signal is lower than said threshold.

16. The method as claimed in claim 13, wherein said ratio combination comprises a percentage of a period of said requesting signal being occupied by said high-state period and another percentage of said period of said requesting signal being occupied by said low-state period.

* * * * *